US012756609B2

(12) United States Patent
Hu et al.

(10) Patent No.: US 12,756,609 B2
(45) Date of Patent: Oct. 6, 2026

(54) PAPR REDUCTION FOR RESOURCE UNIT DUPLICATION AND TONE REPETITION

(71) Applicant: MediaTek Inc., Hsinchu City (TW)

(72) Inventors: Shengquan Hu, San Jose, CA (US); Jianhan Liu, San Jose, CA (US); Tung Sheng Yang, Hsinchu City (TW); Thomas Edward Pare, Jr., San Jose, CA (US)

(73) Assignee: MediaTek Inc., Hsinchu City (TW)

( * ) Notice: Subject to any disclaimer, the term of this patent is extended or adjusted under 35 U.S.C. 154(b) by 389 days.

(21) Appl. No.: 18/226,831

(22) Filed: Jul. 27, 2023

(65) Prior Publication Data

US 2024/0048421 A1 Feb. 8, 2024

Related U.S. Application Data

(60) Provisional application No. 63/370,510, filed on Aug. 5, 2022.

(51) Int. Cl.
*H04L 27/26* (2006.01)

(52) U.S. Cl.
CPC .................................. *H04L 27/262* (2013.01)

(58) Field of Classification Search
CPC ............... H04L 27/262; H04L 27/2602; H04L 27/2618; H04L 27/2621
See application file for complete search history.

(56) References Cited

U.S. PATENT DOCUMENTS

| | | | | |
|---|---|---|---|---|
| 10,153,857 | B1 * | 12/2018 | Chu | H04W 72/21 |
| 10,938,495 | B1 * | 3/2021 | Chu | H04L 5/0007 |
| 12,170,628 | B2 * | 12/2024 | Hu | H04L 27/26132 |
| 2013/0208822 | A1 * | 8/2013 | Zhang | H04L 27/2627 375/295 |
| 2021/0068104 | A1 * | 3/2021 | Chen | H04L 5/0094 |
| 2022/0407644 | A1 * | 12/2022 | Cao | H04L 5/0044 |
| 2023/0061723 | A1 * | 3/2023 | Noh | H04L 27/2603 |
| 2023/0283421 | A1 * | 9/2023 | Lim | H04L 27/2602 370/338 |
| 2024/0015059 | A1 * | 1/2024 | Balakrishnan | H04L 27/2085 |
| 2024/0146589 | A1 * | 5/2024 | Lim | H04L 5/0048 |

FOREIGN PATENT DOCUMENTS

WO WO 2022005194 A1 1/2022

OTHER PUBLICATIONS

European Patent Office, Extended European Search Report in European Patent Application No. 23188315.8, Jan. 5, 2024.

(Continued)

*Primary Examiner* — Jay P Patel
(74) *Attorney, Agent, or Firm* — Andy M. Han; Han IP PLLC

(57) ABSTRACT

Various schemes pertaining to peak-to-average power ratio (PAPR) reduction for resource unit (RU) duplication and tone repetition in wireless communications are described. An apparatus generates a resource unit (RU) or multi-RU (MRU). The apparatus then performs a wireless communication using the RU or MRU with either or both of a RU duplication and a tone repetition such that a peak-to-average power ratio (PAPR) is reduced.

10 Claims, 18 Drawing Sheets

(56) References Cited

OTHER PUBLICATIONS

Eunsung Park (LG Electronics): "PAPR issues for EHT ER SU PPDU", IEEE Draft; 11-20-1135-00-00BE-Papr-Issues-For-Eht-Er-Su-Ppdu, IEEE-SA Mentor, Piscataway, NJ USA, vol. 802.11 EHT; 802.11be, Jul. 27, 2020 (Jul. 27, 2020), pp. 1-10, XP068170267.

Chenchen Liu (Huawei): "Discussions on PAPR Reduction Methods for DUP Mode", IEEE Draft; 11-20-1206-01-00BE-DISCUSSIONS-ON-PAPR-REDUCTION-METHODS-FOR-DUP-MODE, IEEE-SA Mentor, Piscataway, NJ USA, vol. 802.11 EHT; 802.11be, No. 1, Sep. 28, 2020 (Sep. 28, 2020), pp. 1-14, XP068173626.

* cited by examiner

400

600

800

1000

1200

PAPR REDUCTION FOR RESOURCE UNIT DUPLICATION AND TONE REPETITION

CROSS REFERENCE TO RELATED PATENT APPLICATION

The present disclosure is part of a non-provisional patent application claiming the priority benefit of U.S. Provisional Patent Application No. 63/370,510, filed 5 Aug. 2023, the content of which being incorporated by reference in its entirety.

TECHNICAL FIELD

The present disclosure is generally related to wireless communications and, more particularly, to peak-to-average power ratio (PAPR) reduction for resource unit (RU) duplication and tone repetition in wireless communications.

BACKGROUND

Unless otherwise indicated herein, approaches described in this section are not prior art to the claims listed below and are not admitted as prior art by inclusion in this section.

In wireless communications, such as WiFi (or Wi-Fi) in wireless local area networks (WLANs) in accordance with one or more Institute of Electrical and Electronics Engineers (IEEE) 802.11 standards, transmission methods of RU duplication and frequency-domain tone repetition can achieve low coding rates for Enhanced Long Range (ELR) communications. However, at present time, how to reduce PAPR in wireless transmissions with RU duplication and/or tone repetition remains to be defined or specified. Therefore, there is a need for a solution of PAPR reduction for RU duplication and tone repetition in wireless communications including ELR communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to PAPR reduction for RU duplication and tone repetition in wireless communications. It is believed that implementations of the proposed schemes may address or otherwise alleviate aforementioned issues.

In one aspect, a method may involve generating a RU or multi-RU (MRU). The method may also involve performing a wireless communication using the RU or MRU with either or both of a RU duplication and a tone repetition such that a PAPR is reduced.

In another aspect, an apparatus may include a transceiver and a processor coupled to the transceiver. The transceiver may be configured to transmit and receive wirelessly. The processor may be configured to generate a RU or MRU. The processor may also be configured to perform a wireless communication using the RU or MRU with either or both of a RU duplication and a tone repetition such that a PAPR is reduced.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, Zig Bee, 5$^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to PAPR reduction for RU duplication and tone repetition in wireless communications. According to the present disclosure, a number of possible solutions may be implemented separately or jointly. That is, although these possible solutions may be described below separately, two or more of these possible solutions may be implemented in one combination or another.

It is noteworthy that, in the present disclosure, a regular RU (rRU) refers to a RU with tones that are continuous (e.g., adjacent to one another) and not interleaved, interlaced or otherwise distributed. Moreover, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular multi-RU (MRU) may be interchangeably denoted as MRU78 (or rMRU78), an aggregate (26+106)-tone regular MRU may be interchangeably denoted as MRU132 (or rMRU132), and so on.

It is also noteworthy that, in the present disclosure, a bandwidth of 20 MHz may be interchangeably denoted as BW20 or BW20M, a bandwidth of 40 MHz may be interchangeably denoted as BW40 or BW40M, a bandwidth of 80 MHz may be interchangeably denoted as BW80 or BW80M, a bandwidth of 160 MHz may be interchangeably denoted as BW160 or BW160M, a bandwidth of 240 MHz may be interchangeably denoted as BW240 or BW240M, a bandwidth of 320 MHz may be interchangeably denoted as BW320 or BW320M, a bandwidth of 480 MHz may be interchangeably denoted as BW480 or BW480M, a bandwidth of 500 MHz may be interchangeably denoted as BW500 or BW500M, a bandwidth of 520 MHz may be interchangeably denoted as BW520 or BW520M, a bandwidth of 540 MHz may be interchangeably denoted as BW540 or BW540M, a bandwidth of 640 MHz may be interchangeably denoted as BW640 or BW640M.

Figure 1:
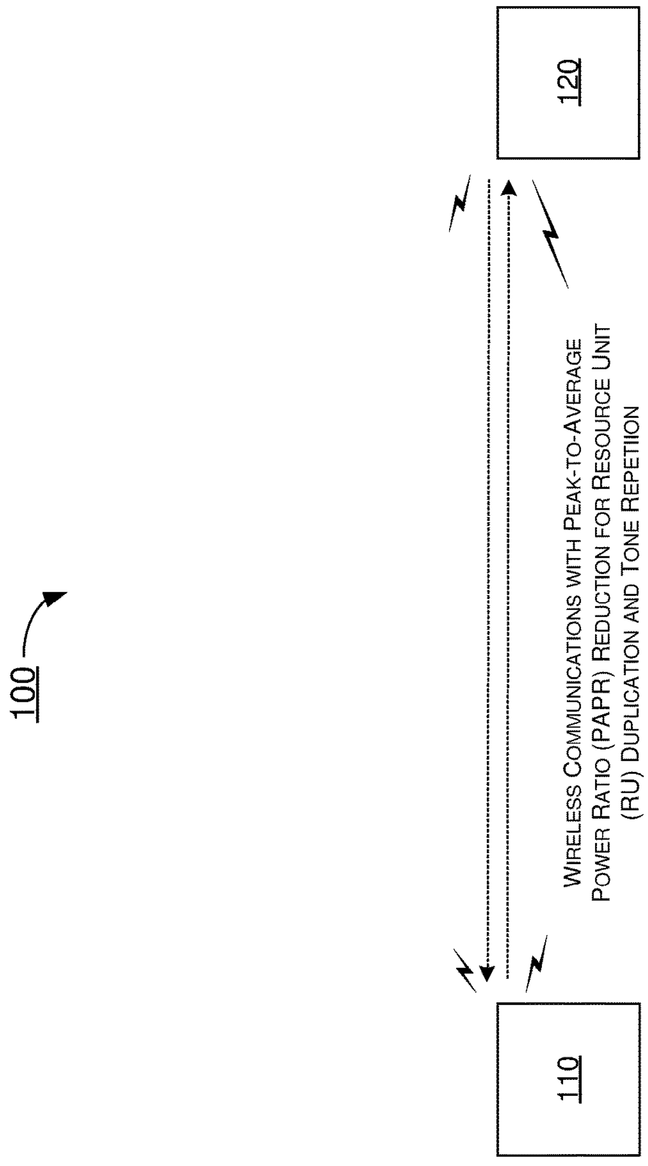
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 18 illustrate examples of implementation of various proposed schemes in network environment 100 in accordance with the present disclosure. The following description of various proposed schemes is provided with reference to FIG. 1~FIG. 18.

Referring to FIG. 1, network environment 100 may involve at least a station (STA) 110 communicating wirelessly with a STA 120. Either of STA 110 and STA 120 may be an access point (AP) STA or, alternatively, either of STA 110 and STA 120 may function as a non-AP STA. In some cases, STA 110 and STA 120 may be associated with a basic service set (BSS) in accordance with one or more IEEE 802.11 standards (e.g., IEEE 802.11 be and future-developed standards). Each of STA 110 and STA 120 may be configured to communicate with each other by utilizing the transmission methods of PAPR reduction for RU duplication and tone repetition in wireless communications in accordance with various proposed schemes described below. That is, either or both of STA 110 and STA 120 may function as a "user" in the proposed schemes and examples described below. It is noteworthy that, while the various proposed schemes may be individually or separately described below, in actual implementations some or all of the proposed schemes may be utilized or otherwise implemented jointly. Of course, each of the proposed schemes may be utilized or otherwise implemented individually or separately.

Figure 2:
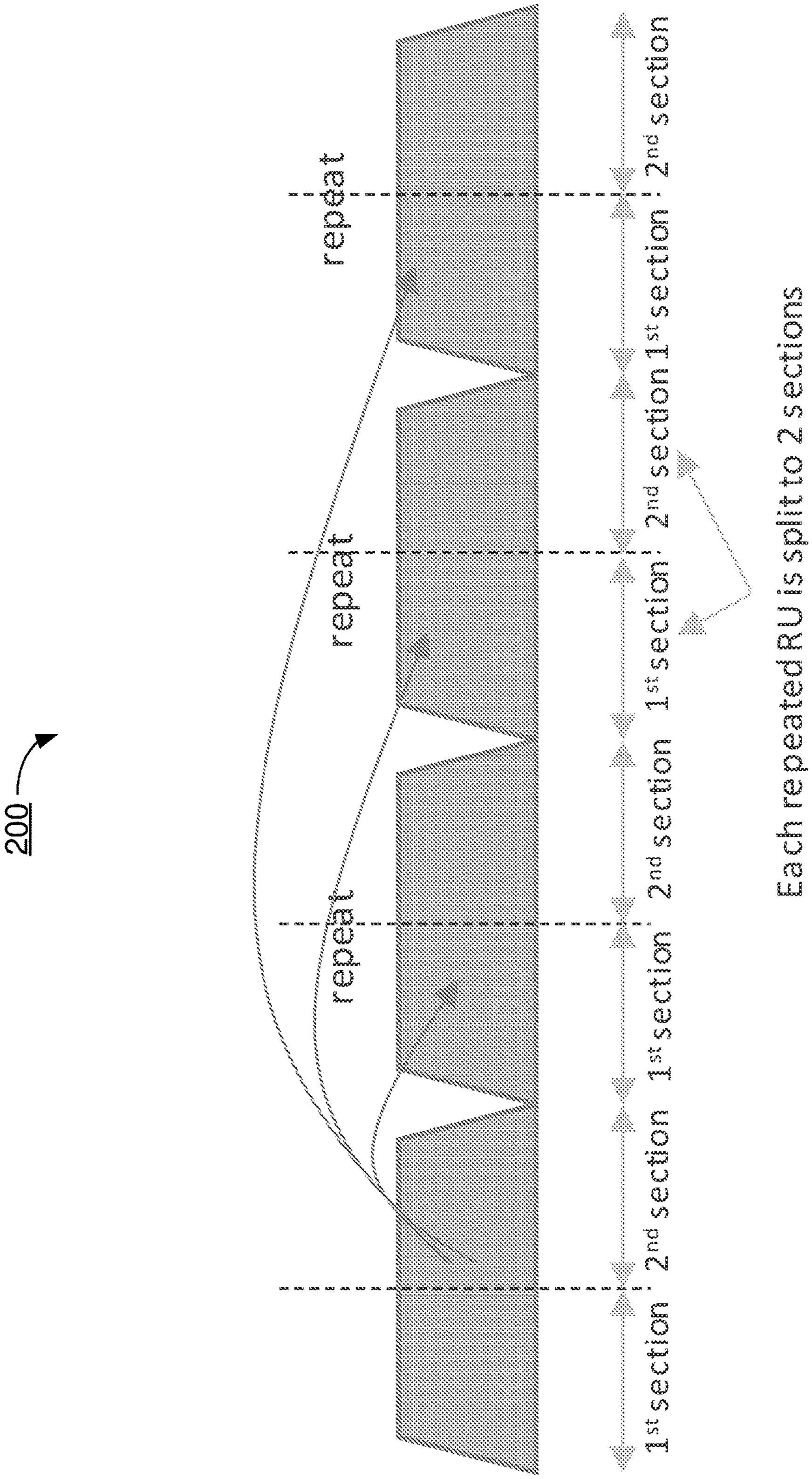
FIG. 2 is a diagram of an example scenario under a proposed scheme in accordance with the present disclosure.

FIG. 2 illustrates an example scenario 200 under a proposed scheme with respect to PAPR reduction for RU duplication in accordance with the present disclosure. Under the proposed scheme, a respective mask sequence may be applied on each repeated/duplicated RU. Additionally, each mask sequence may be applied on data tones (but not pilot tones). As shown in FIG. 2, each repeated RU may be split into two or more sections, with the same rotation value (+1 or −1) being applied on all the tones in the same section of the two or more sections of the RU. Furthermore, the mask sequences utilized may depend on the number of RU duplications/repetitions. Under the proposed scheme, a modulation and coding scheme (MCS) utilizing binary phase-shift keying (BPSK) plus dual-carrier modulation (DCM) or BPSK may be used for optimal mask sequence searches for RU duplication/repetition.

Figure 3:
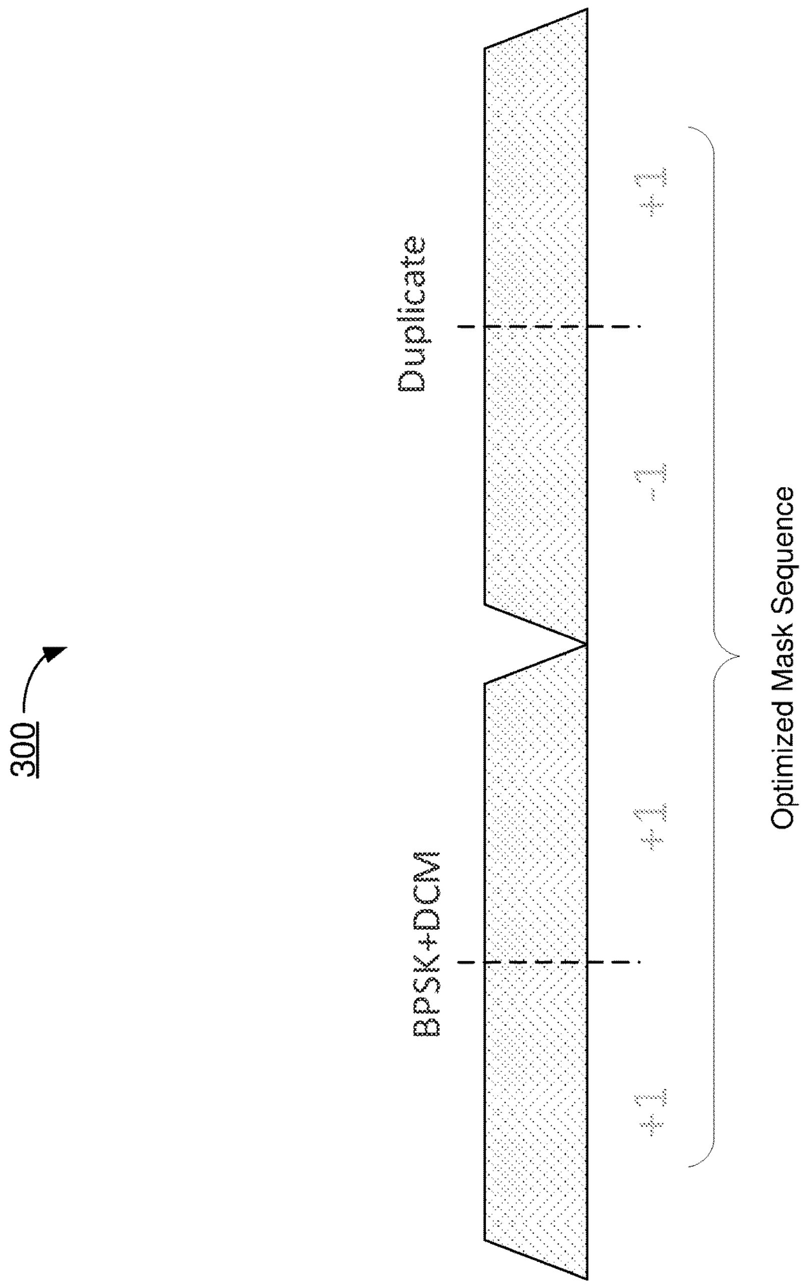
FIG. 3 is a diagram of an example scenario under a proposed scheme in accordance with the present disclosure.
Figure 4:
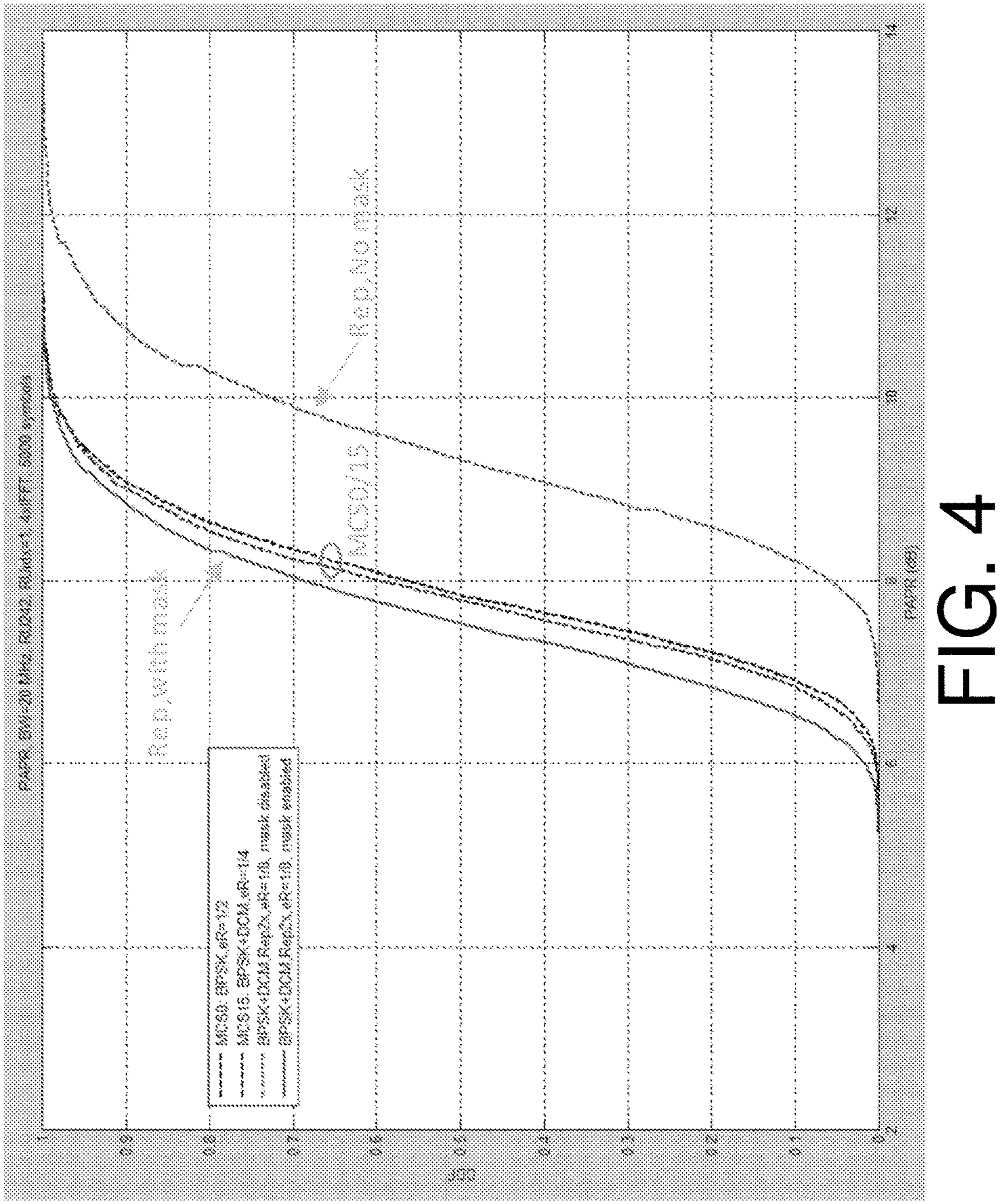
FIG. 4 is a diagram of an example scenario under a proposed scheme in accordance with the present disclosure.

FIG. 3 illustrates an example scenario 300 under the proposed scheme. In scenario 300, PAPR reduction may be achieved for RU with two times (2×) duplication/repetition. There may be $2^4$(=16) options for masking sequence search, and the optimal mask sequence may be [1 1 −1 1], which is the same as IEEE 802.11 be duplication (DUP) mode. FIG. 4 illustrates an example scenario 400 under the proposed scheme. In scenario 400, PAPR reduction for non-orthogonal frequency-division multiple-access (non-OFDMA) for RU with 2× duplication/repetition may be achieved with an effective coding rate (eR)=⅛ for BPSK+DCM modulation or eR=¼ for BPSK modulation.

Figure 5:
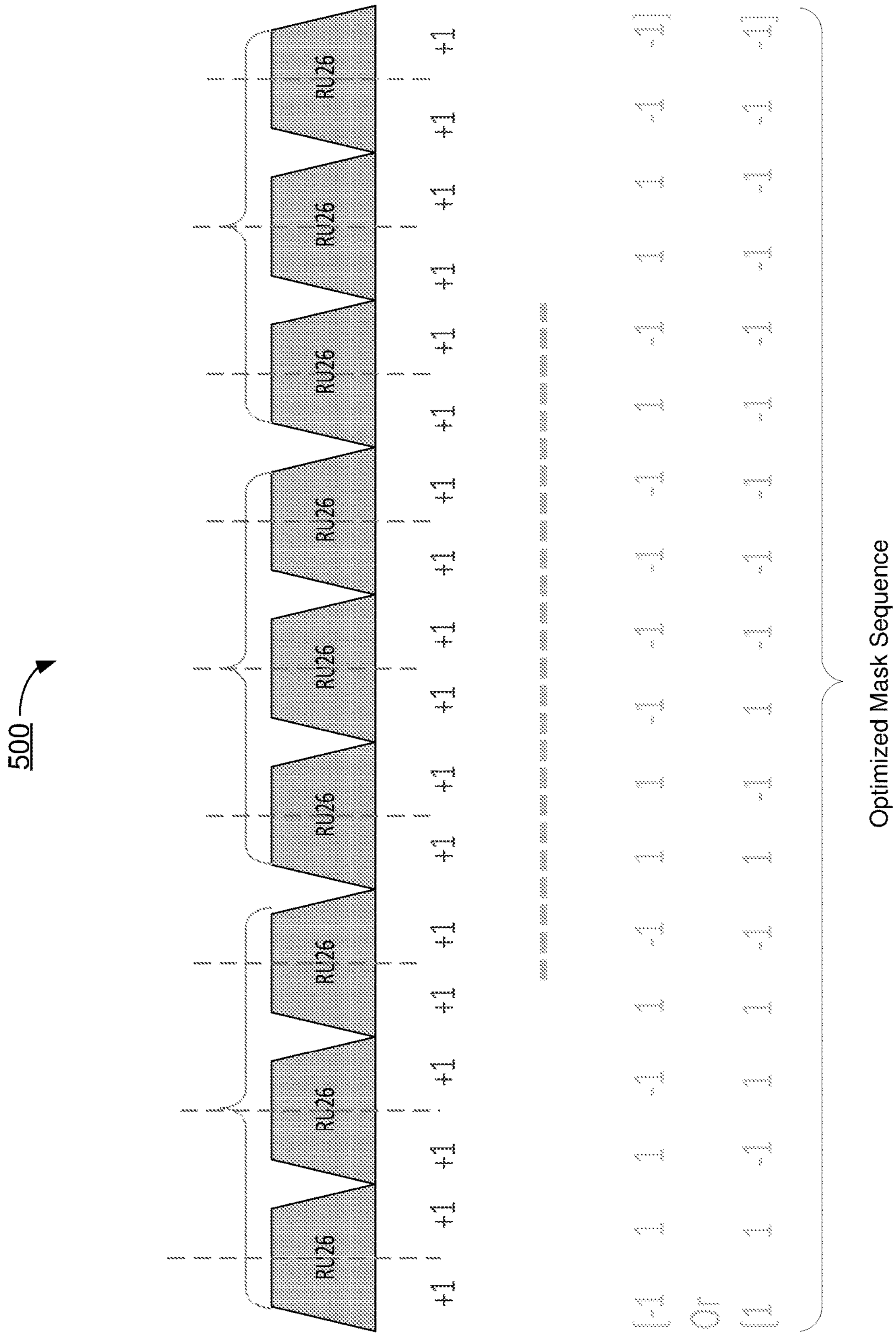
FIG. 5 is a diagram of an example scenario under a proposed scheme in accordance with the present disclosure.
Figure 6:
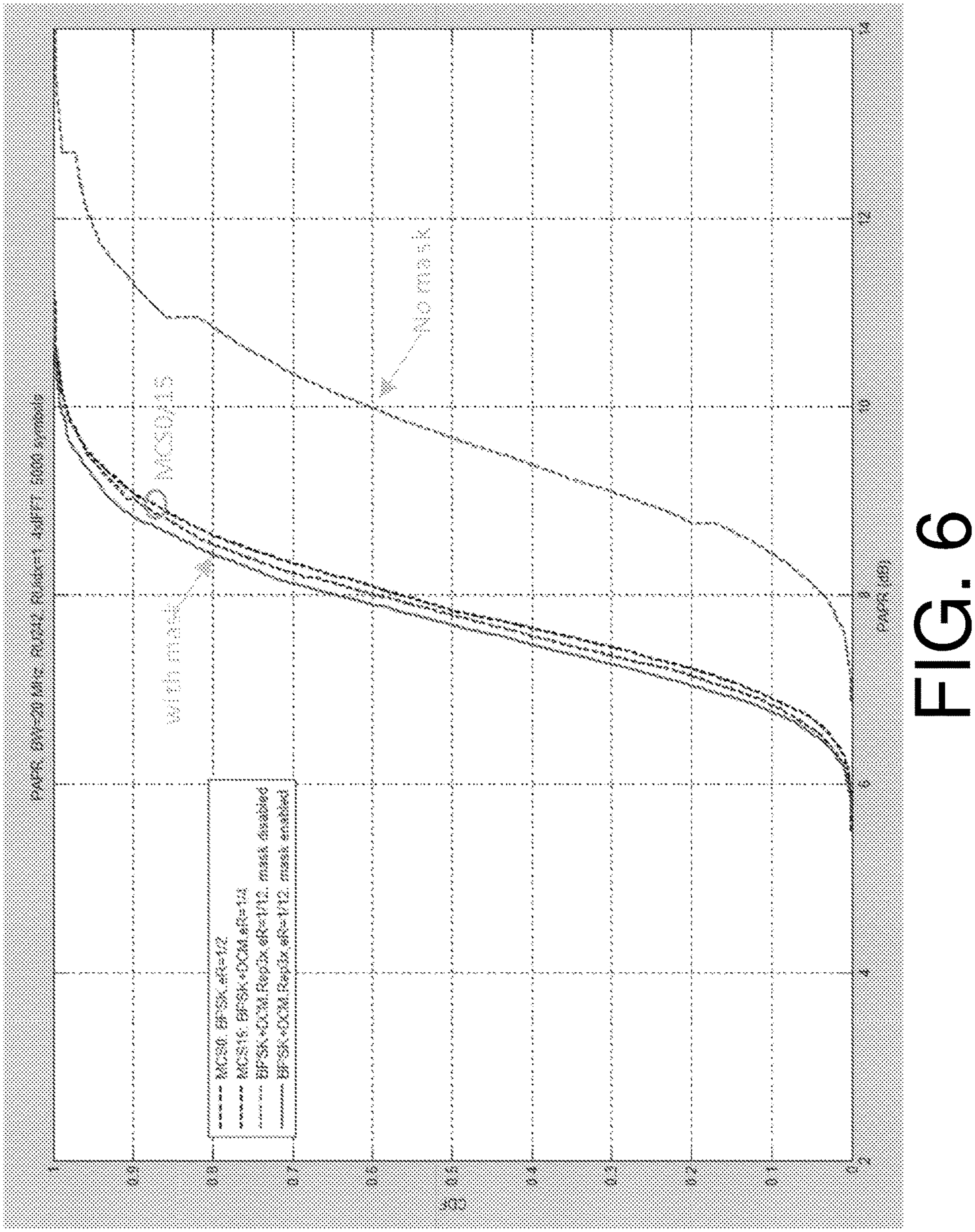
FIG. 6 is a diagram of an example scenario under a proposed scheme in accordance with the present disclosure.

FIG. 5 illustrates an example scenario 500 under the proposed scheme. In scenario 500, PAPR reduction may be achieved for RU with three times (3×) duplication/repetition. There may be $2^{18}$(=26144) options for masking sequence search, and the optimal mask sequence may be [−1 1 1 −1 1 −1 1 1 −1 −1 −1 −1 1 −1 1 1 −1 −1] or [1 1 −1 1 1 −1 1 −1 1 −1 −1 −1 −1 −1 −1 −1 −1 −1]. FIG. 6 illustrates an example scenario 600 under the proposed scheme. In scenario 600, PAPR reduction for non-OFDMA for RU with 3× duplication/repetition may be achieved with eR=1/12 for BPSK+DCM modulation or eR=⅙ for BPSK modulation.

Figure 7:
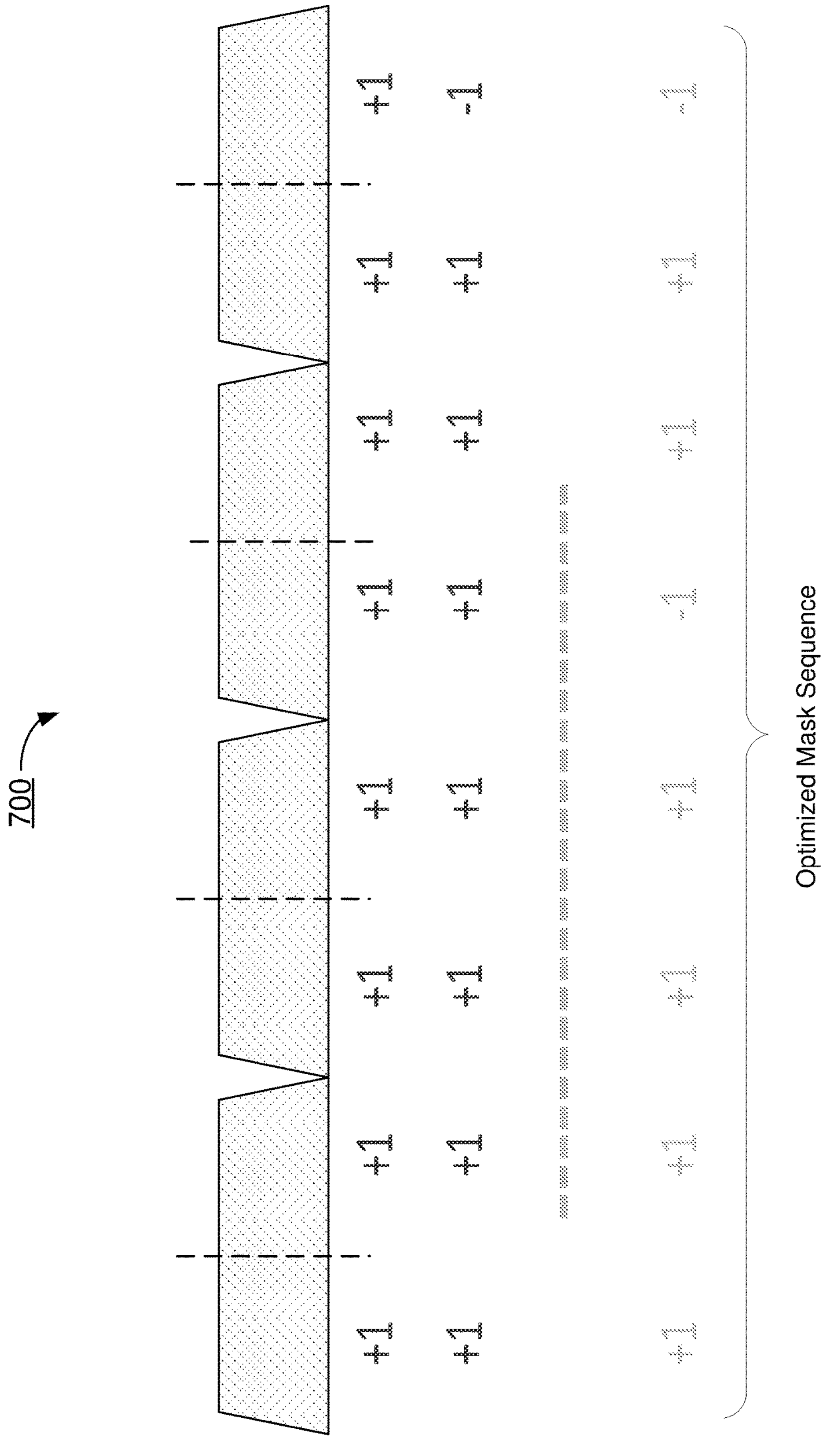
FIG. 7 is a diagram of an example scenario under a proposed scheme in accordance with the present disclosure.
Figure 8:
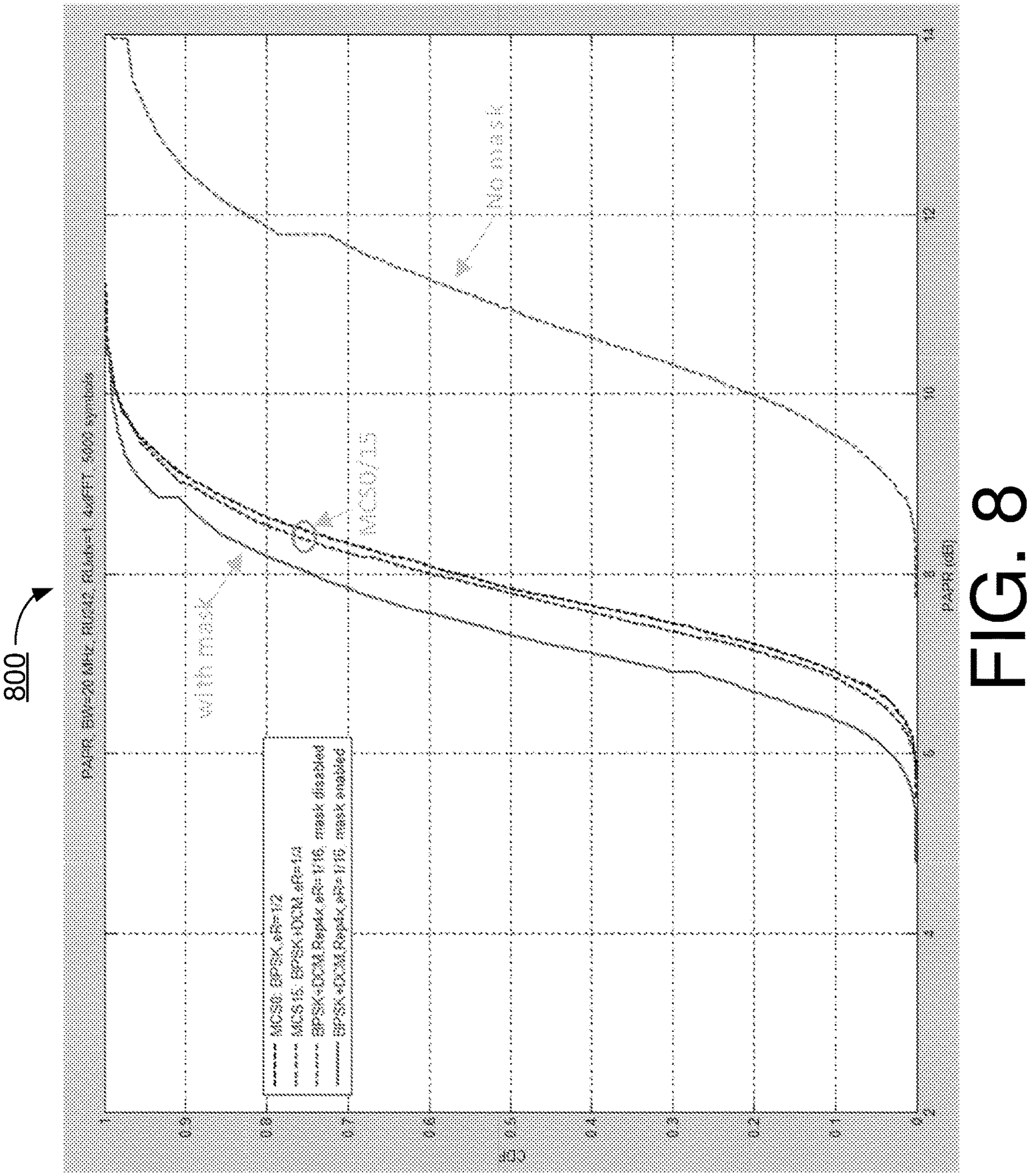
FIG. 8 is a diagram of an example scenario under a proposed scheme in accordance with the present disclosure.

FIG. 7 illustrates an example scenario 700 under the proposed scheme. In scenario 700, PAPR reduction may be achieved for RU with four times (4×) duplication/repetition. There may be $2^8$(=256) options for masking sequence search, and the optimal mask sequence may be [1 1 1 1 −1 1 1 −1]. FIG. 8 illustrates an example scenario 800 under the proposed scheme. In scenario 800, PAPR reduction for non-OFDMA for RU with 4× duplication/repetition may be achieved with eR=1/16.

Figure 9:
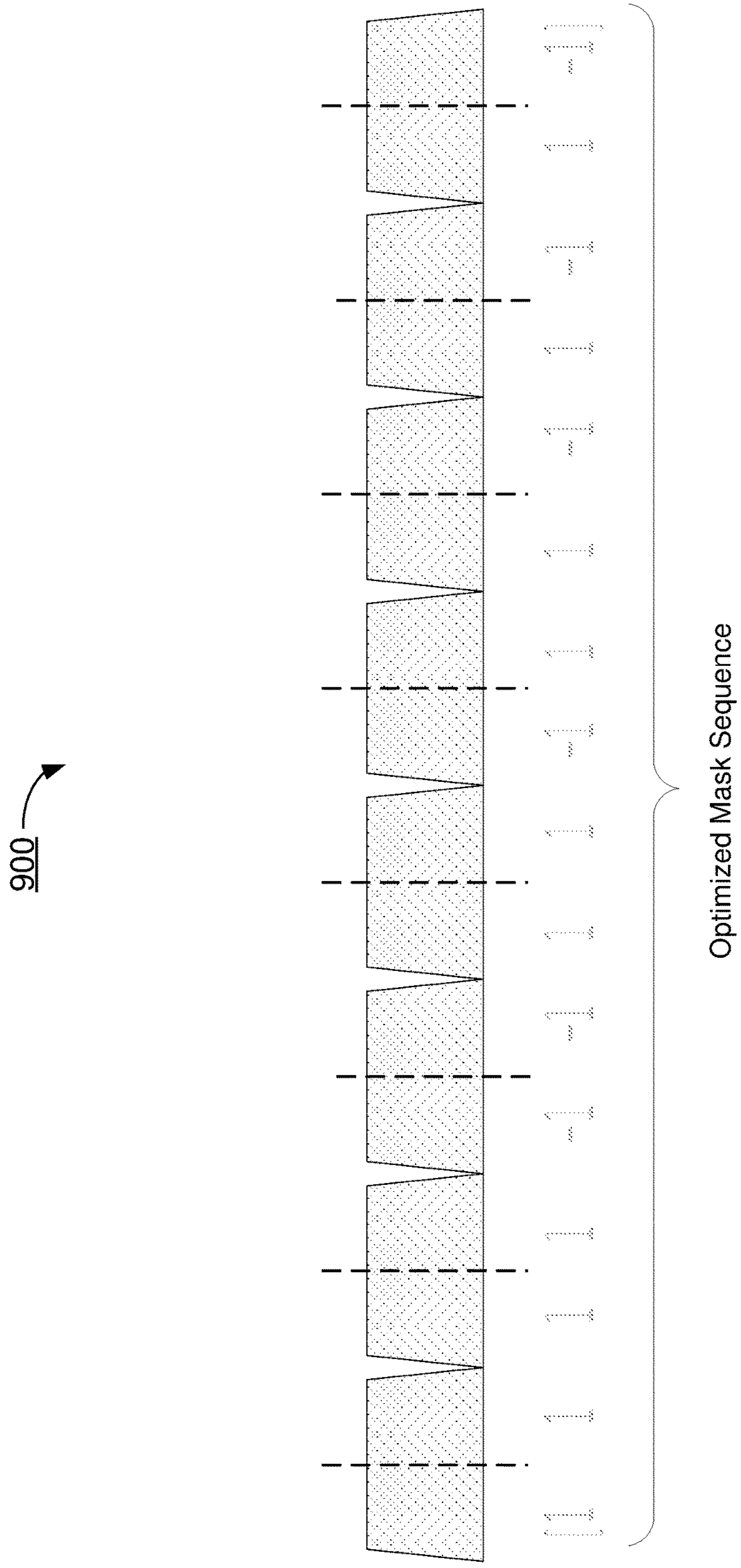
FIG. 9 is a diagram of an example scenario under a proposed scheme in accordance with the present disclosure.
Figure 10:
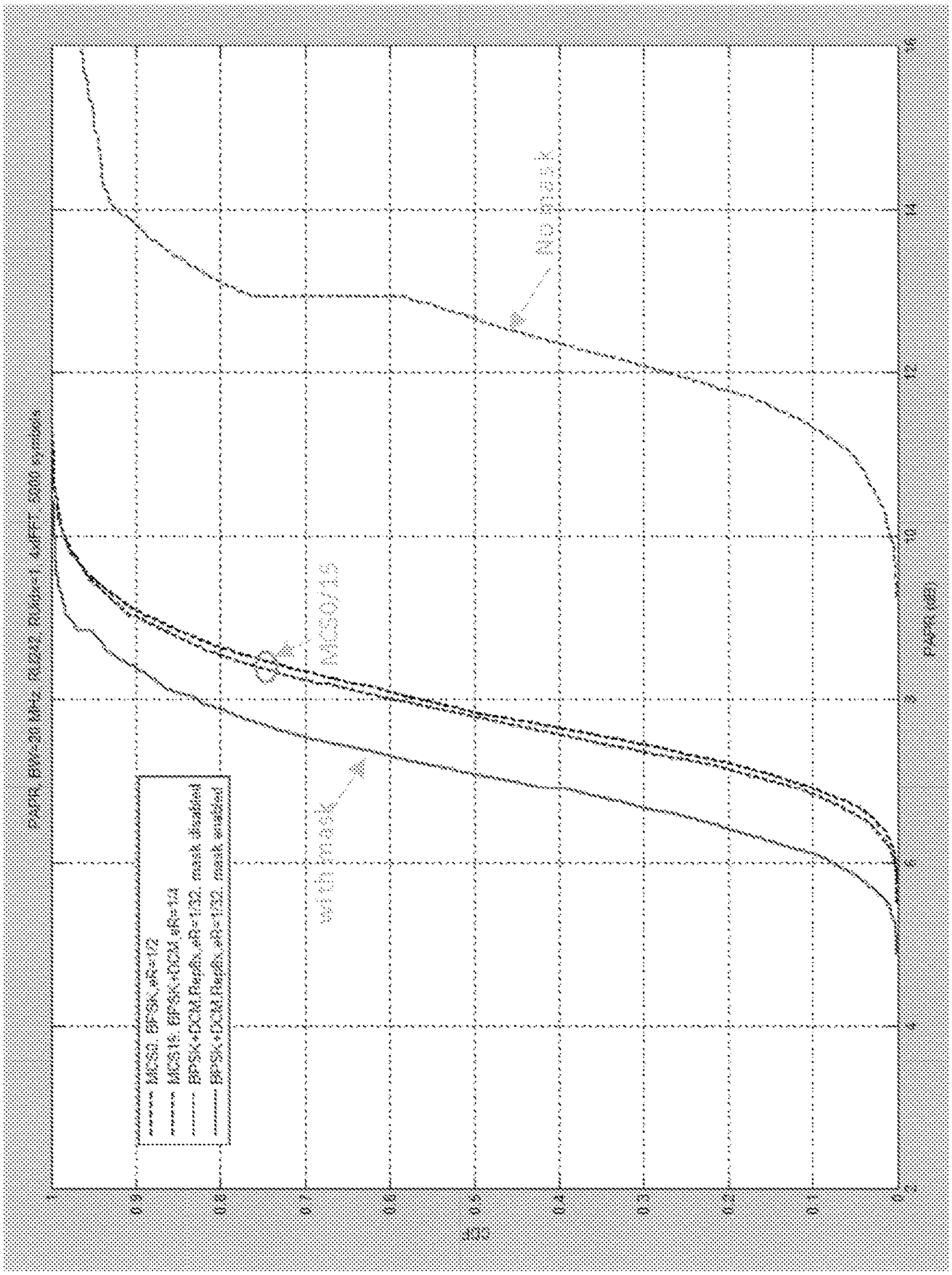
FIG. 10 is a diagram of an example scenario under a proposed scheme in accordance with the present disclosure.

FIG. 9 illustrates an example scenario 900 under the proposed scheme. In scenario 900, PAPR reduction may be achieved for RU with eight times (8×) duplication/repetition. There may be $2^{16}$(=65536) options for masking sequence search, and the optimal mask sequence may be [1 1 1 1 −1 −1 1 1 −1 1 1 −1 1 −1 1 −1]. FIG. 10 illustrates an example scenario 1000 under the proposed scheme. In scenario 1000, PAPR reduction for non-OFDMA for RU with 8× duplication/repetition may be achieved with eR=1/32 for BPSK+DCM modulation or eR=1/16 for BPSK modulation.

Figure 11:
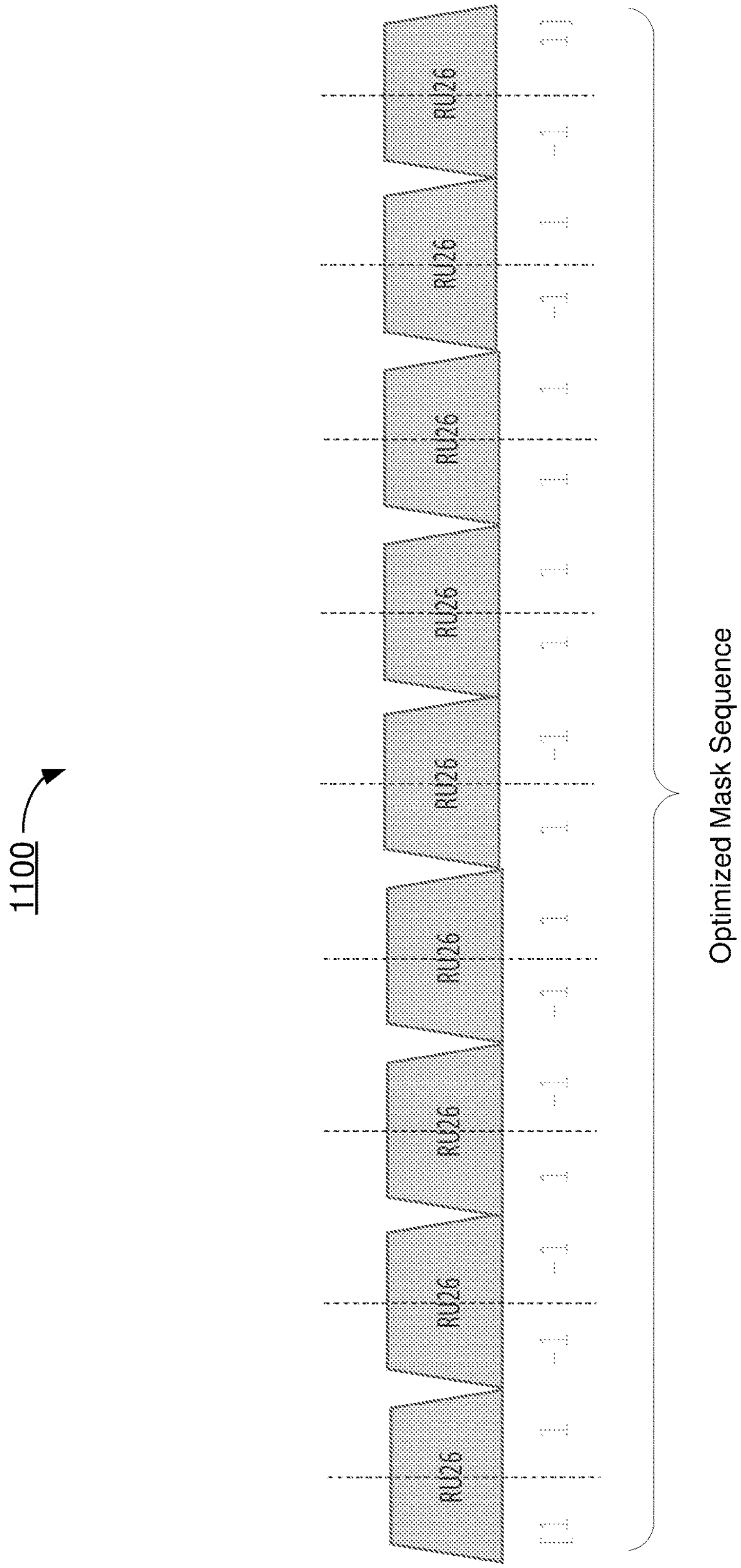
FIG. 11 is a diagram of an example scenario under a proposed scheme in accordance with the present disclosure.
Figure 12:
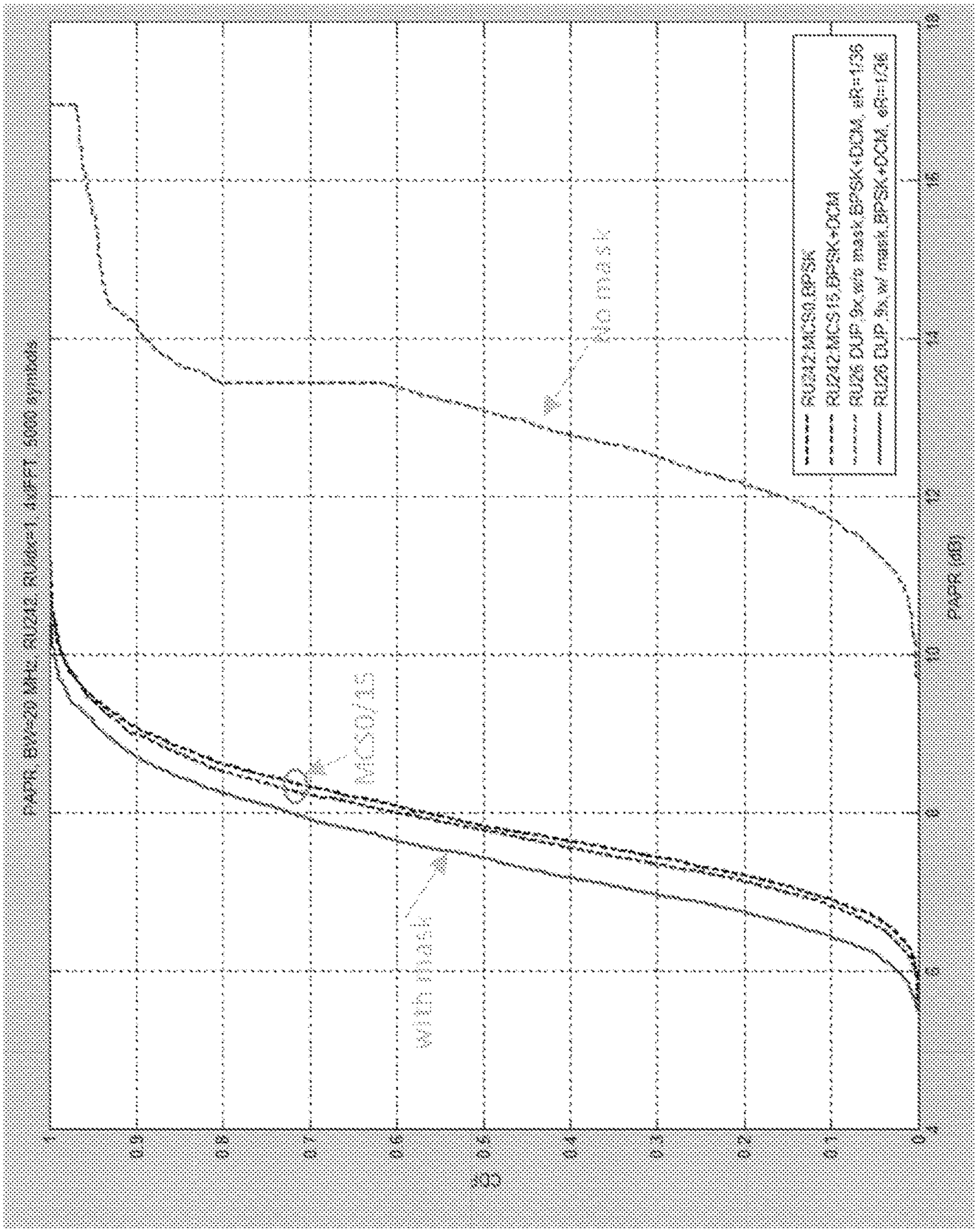
FIG. 12 is a diagram of an example scenario under a proposed scheme in accordance with the present disclosure.

FIG. 11 illustrates an example scenario 1100 under the proposed scheme. In scenario 1100, PAPR reduction may be achieved for RU with nine times (9×) duplication/repetition. There may be $2^{18}$(=262144) options for masking sequence search, and the optimal mask sequence may be [1 1 −1 −1 1 −1 −1 1 1 −1 1 1 1 1 −1 1 −1 1]. FIG. 12 illustrates an example scenario 1200 under the proposed scheme. In scenario 1200, PAPR reduction for non-OFDMA for RU with 9× duplication/repetition may be achieved with eR=1/36 for BPSK+DCM modulation or eR=1/18 for BPSK modulation.

While the above examples may pertain to PAPR reduction for non-OFDMA for RU with duplication/repetition, the proposed scheme may also be applied to achieve PAPR reduction for OFDMA for RU with duplication/repetition. For instance, in a scenario of RU duplication over a 106-tone RU (RU106), PAPR reduction may be achieved with a 26-tone RU (RU26) and/or 52-tone RU (RU52). Specifically, an optimized mask sequence to achieve PAPR reduction for OFDMA using RU52 with 2× duplication/repetition may be [1 1 −1 1]. Moreover, an optimized mask sequence to achieve PAPR reduction for OFDMA using RU26 with 4× duplication/repetition may be [1 1 1 1 −1 1 1 −1]. In a scenario of RU duplication over a RU52, PAPR reduction may be achieved with a RU26. That is, an optimized mask sequence to achieve PAPR reduction for OFDMA using RU26 with 2× duplication/repetition may be [1 1 −1 1]. In a scenario of RU duplication over an aggregate of 26-tone RU and 52-tone RU (MRU(26+52)), PAPR reduction may be achieved with a RU26. That is, an optimized mask sequence to achieve PAPR reduction for OFDMA using RU26 with 3× duplication/repetition may be [1 1 1 −1 −1 1 1 −1 1 −1 1 1].

Figure 13:
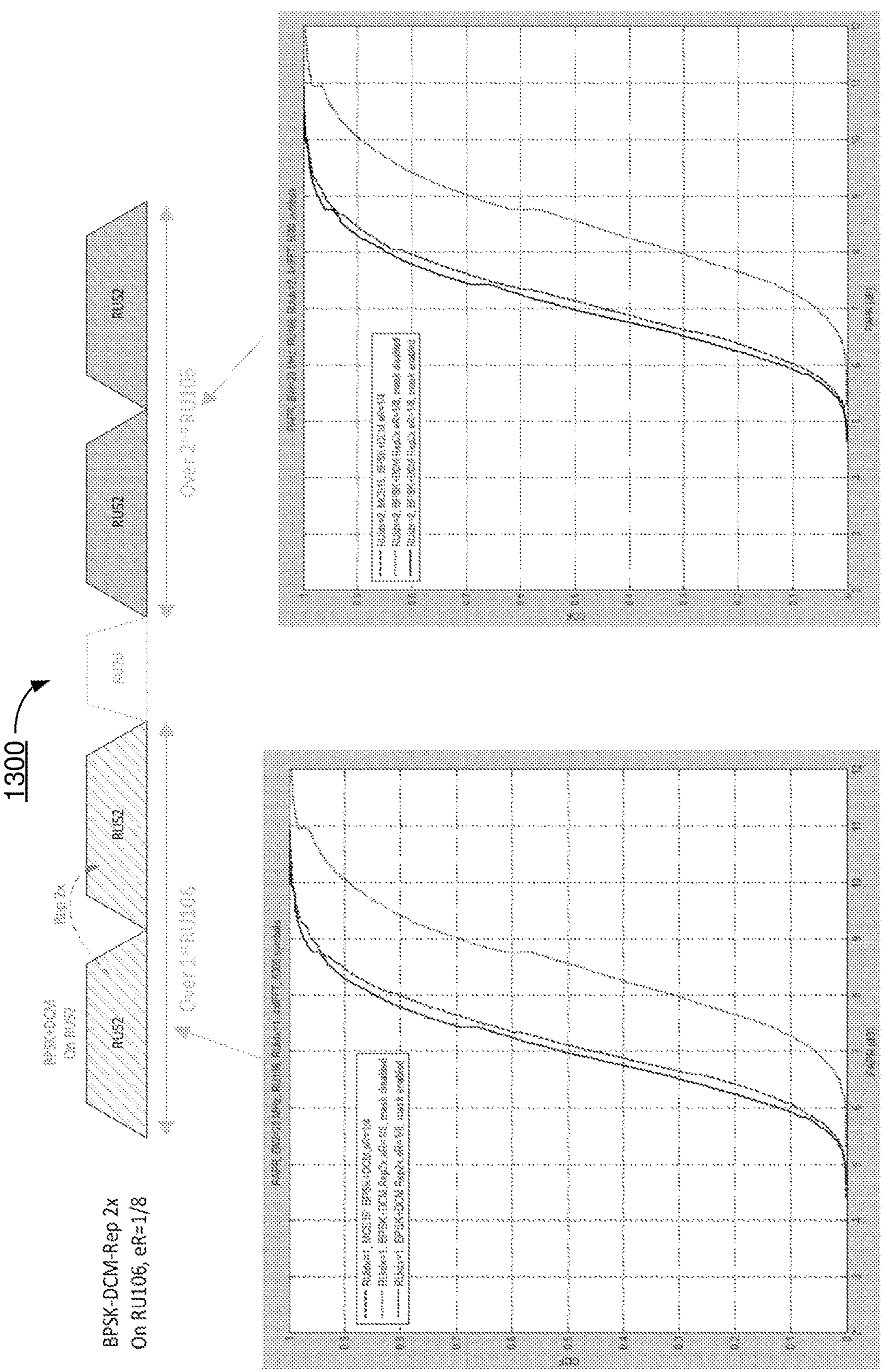
FIG. 13 is a diagram of an example scenario under a proposed scheme in accordance with the present disclosure.
Figure 14:
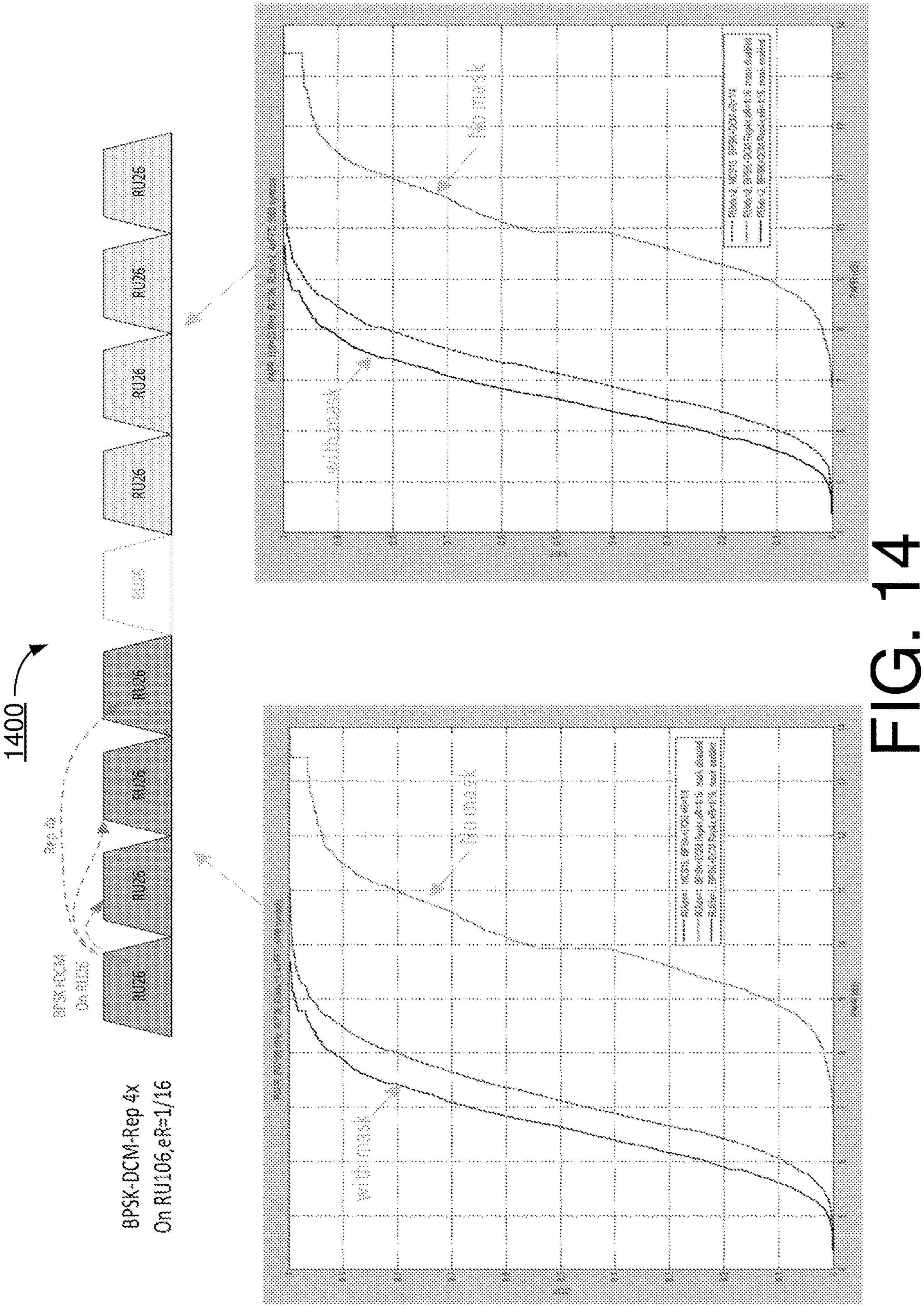
FIG. 14 is a diagram of an example scenario under a proposed scheme in accordance with the present disclosure.
Figure 15:
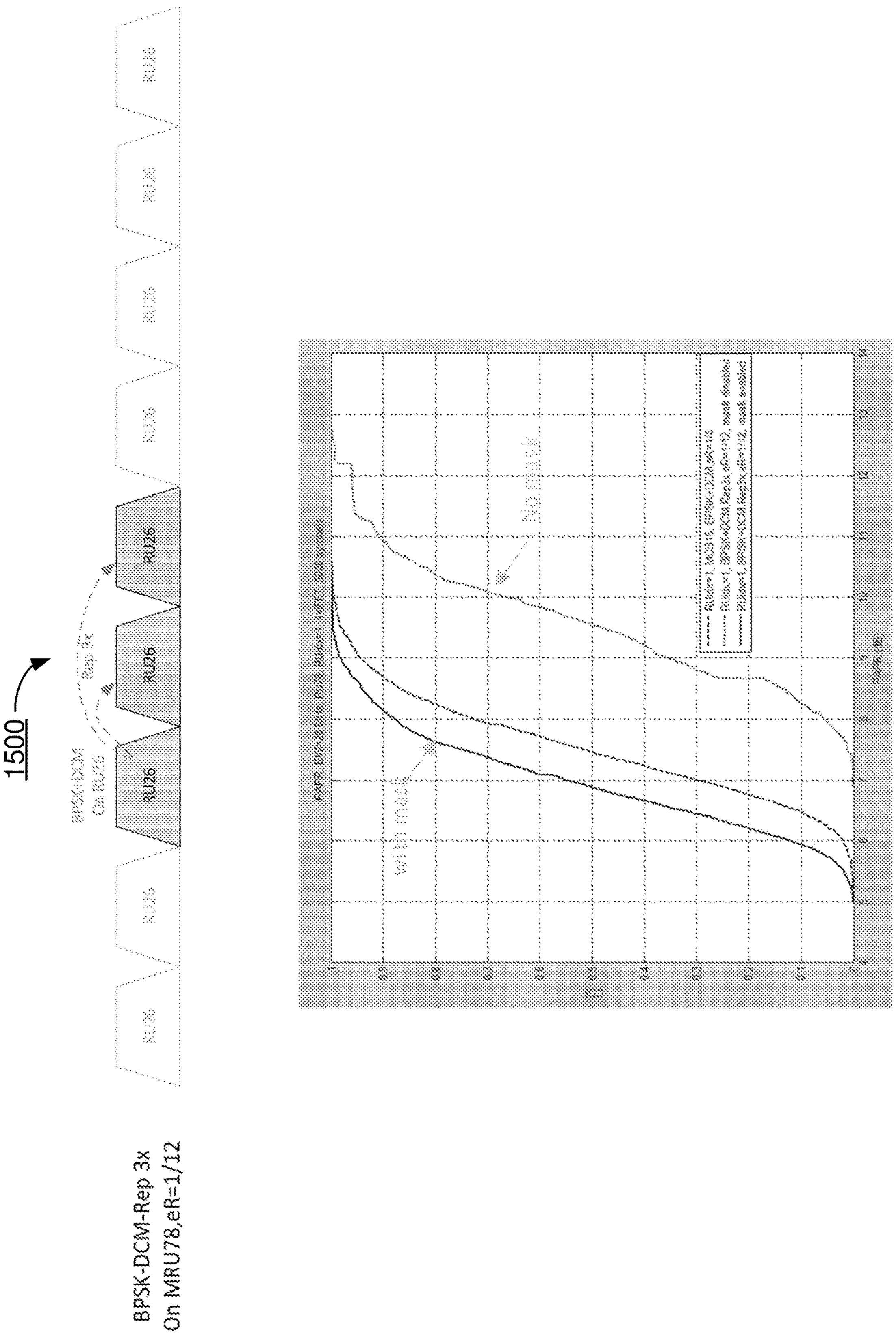
FIG. 15 is a diagram of an example scenario under a proposed scheme in accordance with the present disclosure.

FIG. 13 illustrates an example scenario 1300 under the proposed scheme. In scenario 1300, PAPR reduction for OFDMA RU duplication over a RU106, with 2× duplication/repetition of a RU52, may be achieved with eR=1/8 for BPSK+DCM modulation or eR=1/4 for BPSK modulation. FIG. 14 illustrates an example scenario 1400 under the proposed scheme. In scenario 1400, PAPR reduction for OFDMA RU duplication over a RU106, with 4× duplication/repetition of a RU26, may be achieved with eR=1/16 for BPSK+DCM modulation or eR=1/8 for BPSK modulation. FIG. 15 illustrates an example scenario 1500 under the proposed scheme. In scenario 1500, PAPR reduction for OFDMA RU duplication over an MRU(26+52), with 3× duplication/repetition of a RU26, may be achieved with eR=1/12 for BPSK+DCM modulation or eR=1/6 for BPSK modulation.

Figure 16:
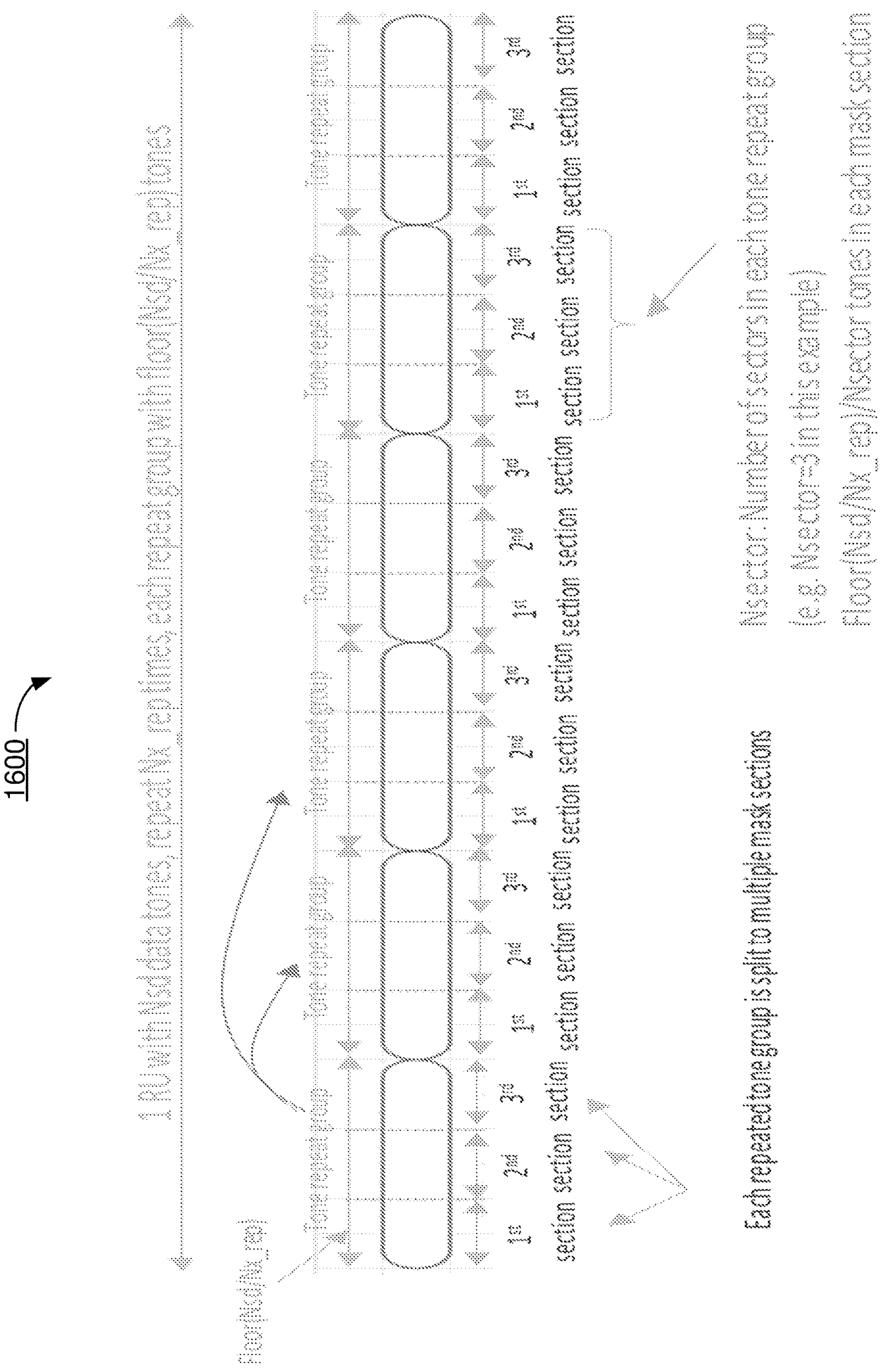
FIG. 16 is a diagram of an example scenario under a proposed scheme in accordance with the present disclosure.

FIG. 16 illustrates an example scenario 1600 under a proposed scheme with respect to PAPR reduction for tone repetition in accordance with the present disclosure. Under the proposed scheme, a respective mask sequence may be applied on each RU with tone repetition. Additionally, each mask sequence may be applied on data tones (but not pilot tones). As shown in FIG. 16, for tone repetition in each RU, a group of tones may be repeated by multiple times, and the number of tones in a repeated group may depend on the RU size and the number of repetitions. Moreover, each repeated group may be split into two or multiple mask sections, with the same rotation value (+1 or −1) being applied on all the tones in the same mask section. Furthermore, the mask sequences utilized may depend on the number of tone repetitions. Under the proposed scheme, an MCS utilizing BPSK may be used for optimal mask sequence searches.

Under a proposed scheme with respect to PAPR reduction for tone repetition in accordance with the present disclosure, different mask sequences may be applied for tone repetition in a 242-tone RU (RU242) depending on the number of repetitions (Nx_rep) and the number of sections in each tone repetition group ($N_{sector}$). For instance, with Nx_rep=2 and $N_{sector}$=3, the mask sequence may be [1 −1 1 1 1 −1]; with Nx_rep=2 and $N_{sector}$=9, the mask sequence may be [−1 −1 −1 1 1 1 −1 −1 1 −1 1 1 −1 1 1 −1 −1 −1]; with Nx_rep=3 and $N_{sector}$=1, the mask sequence may be [−1 −1 1]; with Nx_rep=3 and $N_{sector}$=2, the mask sequence may be [−1 1 −1 1 1 −1]; with Nx_rep=3 and $N_{sector}$=3, the mask sequence may be [1 1 1 −1 1 −1 −1 1 1]; and with Nx_rep=3 and $N_{sector}$=6, the mask sequence may be [1 1 −1 −1 1 −1 −1 1 −1 −1 1 −1 1 −1 1 1 1 1]; with Nx_rep=4 and $N_{sector}$=1, the mask sequence may be [1 1 1 −1]; with Nx_rep32 4 and $N_{sector}$=2, the mask sequence may be [1 1 1 1 1 −1 −1 1]; with Nx_rep=6 and $N_{sector}$=1, the mask sequence may be [−1 −1 −1 1 −1 1]; with Nx_rep=6 and $N_{sector}$=3, the mask sequence may be [1 −1 −1 −1 −1 1 −1 −1 1 −1 −1 −1 −1 1 −1 1 −1 1]; with Nx_rep=8 and $N_{sector}$=1 (with 29 tones per repetition group for a total of 29*8=232 tones), the mask sequence may be [−1 −1 1 1 1 −1 1 −1]; with Nx_rep=8 and $N_{sector}$=2 with 28 tones per repetition group for a total of 28*8=224 tones), the mask sequence may be [1 −1 −1 1 −1 1 −1 1 −1 −1 −1 −1 1 1 −1 −1]; with Nx_rep=9 and $N_{sector}$=1, the mask sequence may be [−1 1 −1 −1 1 −1 −1 −1 1]; and with Nx_rep=9 and $N_{sector}$=2, the mask sequence may be [−1 1 −1 1 1 1 −1 −1 1 1 1 −1 −1 −1 1 1 1 1 1 1].

Moreover, different mask sequences may be applied for tone repetition in a 106-tone RU (RU106) depending on Nx_rep and $N_{sector}$. For instance, with Nx_rep=2 and $N_{sector}$=3, the mask sequence may be [−1 1 1 1 −1 1]; with Nx_rep=3 and $N_{sector}$=2, the mask sequence may be [−1 −1 −1 1 −1 1]; with Nx_rep=4 and $N_{sector}$=1, the mask sequence may be [−1 −1 1 −1]; with Nx_rep=4 and $N_{sector}$=5, the mask sequence may be [−1 −1 −1 1 1 −1 −1 −1 1 1 −1 −1 −1 −1 −1 1 1 1 1 1]; with Nx_rep=6 and $N_{sector}$=1 (with 17 tones per repetition group for a total of 17*6=102 tones), the mask sequence may be [1 −1 −1 −1 −1 1]; with Nx_rep=6 and $N_{sector}$=2 (with 16 tones per repetition group for a total of 16*6=96 tones), the mask sequence may be [1 1 1 −1 1 1 −1 1 1 −1 −1 −1]; with Nx_rep=8 and $N_{sector}$=1, the mask sequence may be [1 −1 −1 −1 1 −1 1 1]; and with Nx_rep=8 and $N_{sector}$=2, the mask sequence may be [1 −1 −1 −1 −1 1 −1 1 −1 −1 −1 1 −1 −1 1 1].

Additionally, different mask sequences may be applied for tone repetition in a 52-tone RU (RU52) depending on Nx_rep and $N_{sector}$. For instance, with Nx_rep=2 and $N_{sector}$=2, the mask sequence may be [1 1 1 −1]; with Nx_rep=2 and $N_{sector}$=3, the mask sequence may be [−1 −1 1 −1 1 −1]; with Nx_rep=2 and $N_{sector}$=4, the mask sequence may be [1 −1 1 1 1 −1 −1 −1]; with Nx_rep=2 and $N_{sector}$=6, the mask sequence may be [−1 1 1 −1 1 1 −1 1 −1 1 −1 1]; with Nx_rep=3 and $N_{sector}$=2, the mask sequence may be [1 −1 1 −1 −1 −1]; with Nx_rep=3 and $N_{sector}$=4, the mask sequence may be [1 1 1 1 1 1 1 −1 −1 −1 1 1]; with Nx_rep=4 and $N_{sector}$=1, the mask sequence may be [1 1 1 −1]; with Nx_rep=4 and $N_{sector}$=2, the mask sequence may be [1 1 1 1 1 −1 −1 1]; with Nx_rep=4 and $N_{sector}$=3, the mask sequence may be [1 1 1 1 1 1 1 1 −1 −1 −1 1]; with Nx_rep=4 and $N_{sector}$=4, the mask sequence may be [1 1 1 1 1 1 1 1 1 −1 −1 −1 −1 1 1 1]; with Nx_rep=6 and $N_{sector}$=1, the mask sequence may be [1 1 −1 1 −1 −1]; with Nx_rep=6 and $N_{sector}$=2, the mask sequence may be [1 1 −1 −1 1 1 −1 1 −1 −1 −1 −1]; with Nx_rep=6 and $N_{sector}$=4, the mask sequence may be [−1 −1 −1 −1 −1 −1 1 1 −1 −1 −1 1 1 −1 1 −1 −1 1 −1 1 −1 1 1 1]; with Nx_rep=8 and $N_{sector}$=1, the mask sequence may be [1 1 −1 −1 1 −1 1 −1]; and with Nx_rep=8 and $N_{sector}$=2, the mask sequence may be [−1 1 −1 1 −1 −1 −1 −1 1 −1 −1 1 −1 −1 1 1].

Furthermore, different mask sequences may be applied for tone repetition in a 26-tone RU (RU26) depending on Nx_rep and $N_{sector}$. For instance, with Nx_rep=2 and $N_{sector}$=2, the mask sequence may be [1 1 −1 1]; with Nx_rep=2 and $N_{sector}$=3, the mask sequence may be [−1 −1 1 1 −1 1]; with Nx_rep=2 and $N_{sector}$=4, the mask sequence may be [−1 1 1 1 1 −1 1 1]; with Nx_rep=2 and $N_{sector}$=6, the mask sequence may be [1 −1 1 1 −1 1 1 1 −1 1 −1 1 −1]; with Nx_rep=3 and $N_{sector}$=2, the mask sequence may be [1 1 −1 −1 1 −1]; with Nx_rep=3 and $N_{sector}$=4, the mask sequence may be [1 −1 1 −1 1 −1 −1 −1 −1 1 1 −1]; with Nx_rep=4 and $N_{sector}$=1, the mask sequence may be [1 1 −1 1]; with Nx_rep=4 and $N_{sector}$=2, the mask sequence may be [−1 1 −1 −1 −1 1 1 1]; with Nx_rep=4 and $N_{sector}$=3, the mask sequence may be [1 −1 1 1 −1 1 −1 −1 −1 1 1 1]; with Nx_rep=6 and $N_{sector}$=1, the mask sequence may be [−1 −1 1 1 −1 1]; with Nx_rep=6 and $N_{sector}$=2, the mask sequence may be [1 −1 1 −1 1 −1 −1 −1 −1 1 1 −1]; and with Nx_rep=8 and $N_{sector}$=1, the mask sequence may be [−1 1 −1 1 −1 −1 1 1].

Illustrative Implementations

Figure 17:
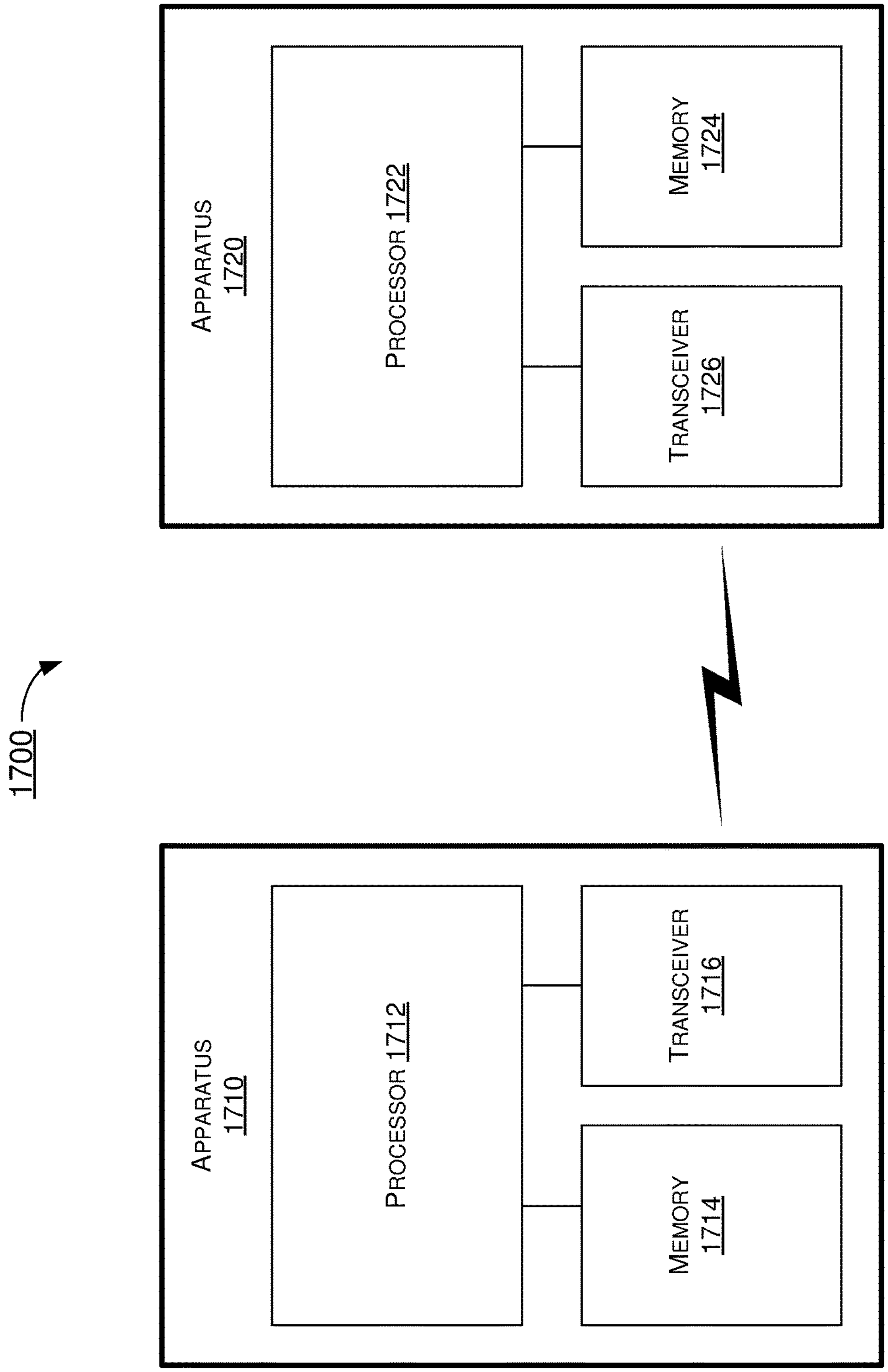
FIG. 17 is a block diagram of an example communication system in accordance with an implementation of the present disclosure.

FIG. 17 illustrates an example system 1700 having at least an example apparatus 1710 and an example apparatus 1720 in accordance with an implementation of the present disclosure. Each of apparatus 1710 and apparatus 1720 may perform various functions to implement schemes, techniques, processes and methods described herein pertaining to PAPR reduction for RU duplication and tone repetition in wireless communications, including the various schemes described above with respect to various proposed designs, concepts, schemes, systems and methods described above as well as processes described below. For instance, apparatus 1710 may be an example implementation of communication entity 110, and apparatus 1720 may be an example implementation of communication entity 120.

Each of apparatus 1710 and apparatus 1720 may be a part of an electronic apparatus, which may be a STA or an AP, such as a portable or mobile apparatus, a wearable apparatus, a wireless communication apparatus or a computing apparatus. For instance, each of apparatus 1710 and apparatus 1720 may be implemented in a smartphone, a smart watch, a personal digital assistant, a digital camera, or a computing equipment such as a tablet computer, a laptop computer or a notebook computer. Each of apparatus 1710 and apparatus 1720 may also be a part of a machine type apparatus, which may be an IoT apparatus such as an immobile or a stationary apparatus, a home apparatus, a wire communication apparatus or a computing apparatus. For instance, each of apparatus 1710 and apparatus 1720 may be implemented in a smart thermostat, a smart fridge, a smart door lock, a wireless speaker or a home control center. When implemented in or as a network apparatus, apparatus 1710 and/or apparatus 1720 may be implemented in a network node, such as an AP in a WLAN.

In some implementations, each of apparatus 1710 and apparatus 1720 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1710 and apparatus 1720 may be implemented in or as a STA or an AP. Each of apparatus 1710 and apparatus 1720 may include at least some of those components shown in FIG. 17 such as a processor 1712 and a processor 1722, respectively, for example. Each of apparatus 1710 and apparatus 1720 may further include one or more other components not pertinent to the proposed scheme of the present disclosure (e.g., internal power supply, display device and/or user interface device), and, thus, such component(s) of apparatus 1710 and apparatus 1720 are neither shown in FIG. 17 nor described below in the interest of simplicity and brevity.

In one aspect, each of processor 1712 and processor 1722 may be implemented in the form of one or more single-core processors, one or more multi-core processors, one or more RISC processors or one or more CISC processors. That is, even though a singular term "a processor" is used herein to refer to processor 1712 and processor 1722, each of processor 1712 and processor 1722 may include multiple processors in some implementations and a single processor in other implementations in accordance with the present disclosure. In another aspect, each of processor 1712 and processor 1722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1712 and processor 1722 is a special-purpose machine specifically designed, arranged and configured to perform specific tasks including those pertaining to PAPR reduction for RU duplication and tone repetition in wireless communications in accordance with various implementations of the present disclosure. For instance, each of processor 1712 and processor 1722 may be configured with hardware components, or circuitry, implementing one, some or all of the examples described and illustrated herein.

In some implementations, apparatus 1710 may also include a transceiver 1716 coupled to processor 1712. Transceiver 1716 may be capable of wirelessly transmitting and receiving data. In some implementations, apparatus 1720 may also include a transceiver 1726 coupled to processor 1722. Transceiver 1726 may include a transceiver capable of wirelessly transmitting and receiving data.

In some implementations, apparatus 1710 may further include a memory 1714 coupled to processor 1712 and capable of being accessed by processor 1712 and storing data therein. In some implementations, apparatus 1720 may further include a memory 1724 coupled to processor 1722 and capable of being accessed by processor 1722 and storing data therein. Each of memory 1714 and memory 1724 may include a type of random-access memory (RAM) such as dynamic RAM (DRAM), static RAM (SRAM), thyristor RAM (T-RAM) and/or zero-capacitor RAM (Z-RAM).

Alternatively, or additionally, each of memory 1714 and memory 1724 may include a type of read-only memory (ROM) such as mask ROM, programmable ROM (PROM), erasable programmable ROM (EPROM) and/or electrically erasable programmable ROM (EEPROM). Alternatively, or additionally, each of memory 1714 and memory 1724 may include a type of non-volatile random-access memory (NVRAM) such as flash memory, solid-state memory, ferroelectric RAM (FeRAM), magnetoresistive RAM (MRAM) and/or phase-change memory.

Each of apparatus 1710 and apparatus 1720 may be a communication entity capable of communicating with each other using various proposed schemes in accordance with the present disclosure. For illustrative purposes and without limitation, a description of capabilities of apparatus 1710, as communication entity 110, and apparatus 1720, as communication entity 120, is provided below. It is noteworthy that, although the example implementations described below are provided in the context of WLAN, the same may be implemented in other types of networks. Thus, although the following description of example implementations pertains to a scenario in which apparatus 1710 functions as a transmitting device and apparatus 1720 functions as a receiving device, the same is also applicable to another scenario in which apparatus 1710 functions as a receiving device and apparatus 1720 functions as a transmitting device.

Under a proposed scheme in accordance with the present disclosure with respect to PAPR reduction for RU duplication and tone repetition in wireless communications, processor 1712 of apparatus 1710 may generate a RU or MRU. Moreover, processor 1712 may perform, via transceiver 1716, a wireless communication using the RU or MRU with either or both of a RU duplication and a tone repetition such that a PAPR is reduced.

In some implementations, in performing the wireless communication using the RU or MRU with the RU duplication, processor 1712 may apply a mask sequence on data tones of each duplicated RU or MRU. In some implementations, each duplicated RU or MRU may be split into two or more sections. In such cases, in applying the mask sequence on each duplicated RU or MRU, processor 1712 may apply a same rotation value on all data tones in a respective section of the two or more sections of each duplicated RU or MRU.

Alternatively, or additionally, in applying the mask sequence on each duplicated RU or MRU, processor 1712 may apply a respective mask sequence corresponding to a number of duplications of the RU or MRU. In some implementations, responsive to the wireless communication comprising a non-OFDMA communication, the respective mask sequence may include one of: (i) [1 1 −1 1] responsive to duplication of two times (2×); (ii) [−1 1 1 −1 1 −1 1 1 −1 −1 −1 −1 1 −1 1 1 −1 −1] responsive to duplication of three times (3×); (iii) [1 1 1 1 −1 1 1 −1] responsive to duplication of four times (4×); (iv) [1 1 1 1 −1 1 1 1 −1 1 1 −1 1 −1 1 −1] responsive to duplication of eight timers (8×); and (v) [1 1 −1 −1 1 −1 −1 1 1 −1 1 1 1 1 −1 1 −1 1] responsive to duplication of nine times (9×). In some implementations, responsive to the wireless communication comprising an OFDMA communication, the respective mask sequence comprises one of: (a) [1 1 −1 1] responsive to duplication of two times (2×) with a 52-tone RU (RU52) over a 106-tone RU (RU106) or [1 1 1 1 −1 1 1 −1] responsive to duplication of four times (4×) with a 26-tone RU (RU26) over the RU106; (b) [1 1 −1 1] responsive to duplication of two times (2×) with the RU26 over the RU52; and (c) [1 1 1 −1 −1 1 1 −1 1 −1 1 1] responsive to duplication of three times (3×) with an aggregate of the RU26 and the RU52 (MRU(26+52)).

In some implementations, in performing the wireless communication using the RU or MRU with the tone repetition, processor 1712 may apply a mask sequence on data tones of the RU or MRU. In some implementations, in performing the wireless communication using the RU or MRU with the tone repetition, processor 1712 may also repeat a group of the data tones by multiple times into multiple repeated groups. In such cases, a number of tones in each repeated group may depend on a size of the RU or MRU and a number of repetitions. In some implementations, each repeated group may be split into two or more mask sections. In such cases, in applying the mask sequence, processor 1712 may apply a same rotation value on all data tones in a respective mask section of the two or more mask sections of each repeated group. Moreover, the mask sequence may depend on a size of the RU or MRU and a number of tone repetitions.

Illustrative Processes

Figure 18:
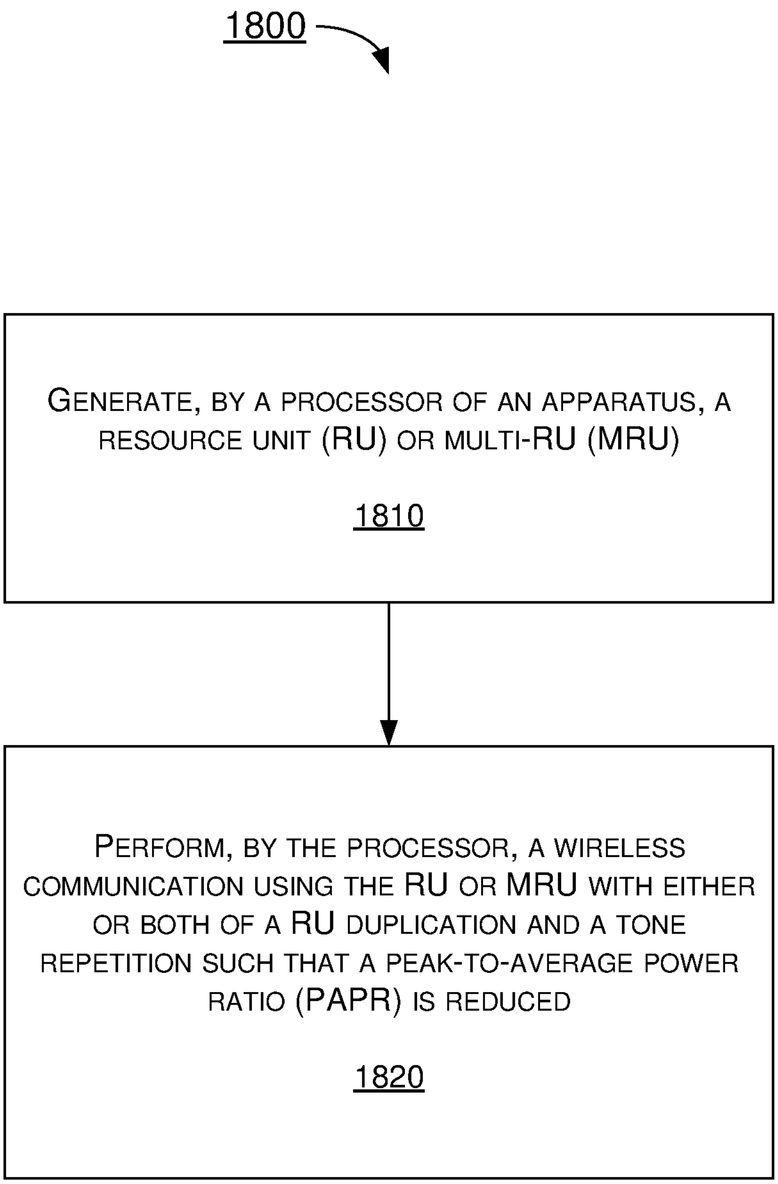
FIG. 18 is a flowchart of an example process in accordance with an implementation of the present disclosure.

FIG. 18 illustrates an example process 1800 in accordance with an implementation of the present disclosure. Process 1800 may represent an aspect of implementing various proposed designs, concepts, schemes, systems and methods described above. More specifically, process 1800 may represent an aspect of the proposed concepts and schemes pertaining to PAPR reduction for RU duplication and tone repetition in wireless communications in accordance with the present disclosure. Process 1800 may include one or more operations, actions, or functions as illustrated by one or more of blocks 1810 and 1820. Although illustrated as discrete blocks, various blocks of process 1800 may be divided into additional blocks, combined into fewer blocks, or eliminated, depending on the desired implementation. Moreover, the blocks/sub-blocks of process 1800 may be executed in the order shown in FIG. 18 or, alternatively in a different order. Furthermore, one or more of the blocks/sub-blocks of process 1800 may be executed repeatedly or iteratively. Process 1800 may be implemented by or in apparatus 1710 and apparatus 1720 as well as any variations thereof. Solely for illustrative purposes and without limiting the scope, process 1800 is described below in the context of apparatus 1710 as communication entity 110 (e.g., a transmitting device whether a STA or an AP) and apparatus 1720 as communication entity 120 (e.g., a receiving device whether a STA or an AP) of a wireless network such as a WLAN in accordance with one or more of IEEE 802.11 standards. Process 1800 may begin at block 1810.

At 1810, process 1800 may involve processor 1712 of apparatus 1710 generating a RU or MRU. Process 1800 may proceed from 1810 to 1820.

At 1820, process 1800 may involve processor 1712 performing, via transceiver 1716, a wireless communication using the RU or MRU with either or both of a RU duplication and a tone repetition such that a PAPR is reduced.

In some implementations, in performing the wireless communication using the RU or MRU with the RU duplication, process 1800 may involve processor 1712 applying a mask sequence on data tones of each duplicated RU or MRU. In some implementations, each duplicated RU or MRU may be split into two or more sections. In such cases, in applying the mask sequence on each duplicated RU or MRU, process 1800 may involve processor 1712 applying a same rotation value on all data tones in a respective section of the two or more sections of each duplicated RU or MRU.

Alternatively, or additionally, in applying the mask sequence on each duplicated RU or MRU, process 1800 may involve processor 1712 applying a respective mask sequence corresponding to a number of duplications of the RU or MRU. In some implementations, responsive to the wireless communication comprising a non-OFDMA communication, the respective mask sequence may include one of: (i) [1 1 −1 1] responsive to duplication of two times (2×); (ii) [−1 1 1 −1 1 −1 1 1 −1 −1 −1 −1 1 −1 1 1 −1 −1] responsive to duplication of three times (3×); (iii) [1 1 1 1 −1 1 1 −1] responsive to duplication of four times (4×); (iv) [1 1 1 1 −1 1 1 1 −1 1 1 −1 1 −1 1 −1] responsive to duplication of eight timers (8×); and (v) [1 1 −1 −1 1 −1 −1 1 1 −1 1 1 1 1 −1 1 −1 1] responsive to duplication of nine times (9×). In some implementations, responsive to the wireless communication comprising an OFDMA communication, the respective mask sequence comprises one of: (a) [1 1 −1 1] responsive to duplication of two times (2×) with a 52-tone RU (RU52) over a 106-tone RU (RU106) or [1 1 1 1 −1 1 1 −1] responsive to duplication of four times (4×) with a 26-tone RU (RU26) over the RU106; (b) [1 1 −1 1] responsive to duplication of two times (2×) with the RU26 over the RU52; and (c) [1 1 1 −1 −1 1 1 −1 1 −1 1 1] responsive to duplication of three times (3×) with an aggregate of the RU26 and the RU52 (MRU(26+52)).

In some implementations, in performing the wireless communication using the RU or MRU with the tone repetition, process 1800 may involve processor 1712 applying a mask sequence on data tones of the RU or MRU. In some implementations, in performing the wireless communication using the RU or MRU with the tone repetition, process 1800 may further involve processor 1712 repeating a group of the data tones by multiple times into multiple repeated groups. In such cases, a number of tones in each repeated group may depend on a size of the RU or MRU and a number of repetitions. In some implementations, each repeated group may be split into two or more mask sections. In such cases, in applying the mask sequence, process 1800 may involve processor 1712 applying a same rotation value on all data tones in a respective mask section of the two or more mask sections of each repeated group. Moreover, the mask sequence may depend on a size of the RU or MRU and a number of tone repetitions.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

generating, by a processor of an apparatus, a resource unit (RU) or multi-RU (MRU); and performing, by the processor, a wireless communication using the RU or MRU with either or both of a RU duplication and a tone repetition such that a peak-to-average power ratio (PAPR) is reduced, wherein the performing of the wireless communication using the RU or MRU with the RU duplication comprises applying a mask sequence on data tones of each duplicated RU or MRU, wherein each duplicated RU or MRU is split into two or more sections, and wherein the applying of the mask sequence on each duplicated RU or MRU comprises:

applying a same rotation value on all data tones in a respective section of the two or more sections of each duplicated RU or MRU; and applying a respective mask sequence corresponding to a number of duplications of the RU or MRU, wherein the wireless communication comprises either a non-orthogonal frequency-division multiple-access (non-OFDMA) communication or an orthogonal frequency-division multiple-access (OFDMA) communication, wherein, responsive to the wireless communication comprising the non-OFDMA communication, the respective mask sequence comprises one of:

[1 1 −1 1] responsive to duplication of two times (2×);

[−1 1 1 −1 1 −1 1 1 −1 −1 −1 −1 1 −1 1 1 −1 −1] responsive to duplication of three times (3×);

[1 1 1 1 −1 1 1 −1] responsive to duplication of four times (4×);

[−1 1 1 1 −1 1 1 −1 1 −1 1 −1] responsive to duplication of eight timers (8×); and

[1 1 −1 −1 1 −1 −1 1 1 1 −1 1 1 1 1 −1 1 −1 1] responsive to duplication of nine times (9×), and wherein, responsive to the wireless communication comprising the OFDMA communication, the respective mask sequence comprises one of:

[1 1 −1 1] responsive to duplication of two times (2×) with a 52-tone RU (RU52) over a 106-tone RU (RU106) or [1 1 1 1 −1 1 1 −1] responsive to duplication of four times (4×) with a 26-tone RU (RU26) over the RU106;

[1 1 −1 1] responsive to duplication of two times (2×) with the RU26 over the RU52; and

[1 1 1 −1 −1 1 1 −1 1 −1 1 1] responsive to duplication of three times (3×) with an aggregate of the RU26 and the RU52 (MRU(26+52).

2. The method of claim 1, wherein the performing of the wireless communication using the RU or MRU with the tone repetition further comprises applying a mask sequence on data tones of the RU or MRU.

3. The method of claim 2, wherein the performing of the wireless communication using the RU or MRU with the tone repetition further comprises repeating a group of the data tones by multiple times into multiple repeated groups, and wherein a number of tones in each repeated group depends on a size of the RU or MRU and a number of repetitions.

4. The method of claim 3, wherein each repeated group is split into two or more mask sections, and wherein the applying of the mask sequence comprises applying a same rotation value on all data tones in a respective mask section of the two or more mask sections of each repeated group.

5. The method of claim 2, wherein the mask sequence depends on a size of the RU or MRU and a number of tone repetitions.

6. An apparatus, comprising:

a transceiver configured to transmit and receive wirelessly; and a processor coupled to the transceiver and configured to perform operations comprising:

generating a resource unit (RU) or multi-RU (MRU); and performing, via the transceiver, a wireless communication using the RU or MRU with either or both of a RU duplication and a tone repetition such that a peak-to-average power ratio (PAPR) is reduced, wherein the performing of the wireless communication using the RU or MRU with the RU duplication comprises applying a mask sequence on data tones of each duplicated RU or MRU, wherein each duplicated RU or MRU is split into two or more sections, and wherein the applying of the mask sequence on each duplicated RU or MRU comprises:

applying a same rotation value on all data tones in a respective section of the two or more sections of each duplicated RU or MRU; and applying a respective mask sequence corresponding to a number of duplications of the RU or MRU, wherein the wireless communication comprises either a non-orthogonal frequency-division multiple-access (non-OFDMA) communication or an orthogonal frequency-division multiple-access (OFDMA) communication, wherein, responsive to the wireless communication comprising the non-OFDMA communication, the respective mask sequence comprises one of:

[1 1−1 1] responsive to duplication of two times (2×);

[−1 1 1 −1 1 −1 1 1 −1 −1 −1 −1 1 −1 1 1 −1 −1] responsive to duplication of three times (3×);

[1 1 1 1 −1 1 1 −1] responsive to duplication of four times (4×);

[1 1 1 1 −1 1 1 1 1 −1 1 1 1 −1 1 −1 1 −1] responsive to duplication of eight timers (8×); and

[1 1 −1 −1 1 −1 −1 1 1 1 −1 1 1 1 1 −1 1 −1 1] responsive to duplication of nine times (9×), and wherein, responsive to the wireless communication comprising the OFDMA communication, the respective mask sequence comprises one of:

[1 1 −1 1] responsive to duplication of two times (2×) with a 52-tone RU (RU52) over a 106-tone RU (RU106) or [1 1 1 1 −1 1 1 −1] responsive to duplication of four times (4×) with a 26-tone RU (RU26) over the RU106;

[1 1 −1 1] responsive to duplication of two times (2×) with the RU26 over the RU52; and

[1 1 1 −1 −1 1 1 −1 1 −1 1 1] responsive to duplication of three times (3×) with an aggregate of the RU26 and the RU52 (MRU(26+52)).

7. The apparatus of claim 6, wherein the performing of the wireless communication using the RU or MRU with the tone repetition further comprises applying a mask sequence on data tones of the RU or MRU.

8. The apparatus of claim 7, wherein the performing of the wireless communication using the RU or MRU with the tone repetition further comprises repeating a group of the data tones by multiple times into multiple repeated groups, and wherein a number of tones in each repeated group depends on a size of the RU or MRU and a number of repetitions.

9. The apparatus of claim 8, wherein each repeated group is split into two or more mask sections, and wherein the applying of the mask sequence comprises applying a same rotation value on all data tones in a respective mask section of the two or more mask sections of each repeated group.

10. The apparatus of claim 7, wherein the mask sequence depends on a size of the RU or MRU and a number of tone repetitions.

* * * * *